United States Patent [19]

Kojima

[11] Patent Number: 4,792,500

[45] Date of Patent: Dec. 20, 1988

[54] ELECTROLUMINESCENCE ELEMENT

[75] Inventor: Kiyoaki Kojima, Tokyo, Japan

[73] Assignee: Clarion Co., Ltd., Tokyo, Japan

[21] Appl. No.: 86,366

[22] Filed: Aug. 17, 1987

[30] Foreign Application Priority Data

Aug. 22, 1986 [JP] Japan ................................ 61-196591

[51] Int. Cl.⁴ ............................ B32B 9/00; H01J 1/62

[52] U.S. Cl. .................................... 428/690; 428/917; 313/503; 313/504; 313/505; 313/506

[58] Field of Search ................ 428/690, 917; 313/503, 313/504, 505, 506

[56] References Cited

U.S. PATENT DOCUMENTS 3,621,321 11/1971 Williams et al. .................... 313/504

3,772,556 11/1973 Williams .............................. 313/504

*Primary Examiner*—George F. Lesmes

*Assistant Examiner*—P. J. Ryan

*Attorney, Agent, or Firm*—Wallenstein, Wagner, Hattis & Strampel, Ltd.

[57] ABSTRACT

A field electroluminescence element has a transparent electrode disposed to form a single-level plane with a substrate surface so that a luminescence layer is provided on the planar surface in order to prevent any irregular crystallization and to improve the reliability of the element.

4 Claims, 3 Drawing Sheets

ELECTROLUMINESCENCE ELEMENT

FIELD OF THE INVENTION

This invention relates to an electroluminescence element in which a substrate and a transparent electrode form a single-level plane so that a light emitting layer is provided on the single-level plane so as to eliminate irregular crystallization and thereby improve the reliability of the element.

BACKGROUND OF THE INVENTION

There is known an electroluminescence element which is one of display elements configured to display letters or figures, using their property of emitting light upon application of an electric field to a certain kind of semiconductor material. FIG. 6 shows an arrangement of a prior art electroluminescence element in which reference numeral 1 refers to an insulative substrate made from glass or other material, 2 to a stripe-shaped transparent electrode provided on one surface of the insulative substrate and made from indium tin oxide (ITO), titanium tin oxide or other material, 3 to a first insulative layer covering surfaces of the insulative substrate 1 and of the transparent electrode 2 and made from silicon nitride ($Si_3N_4$) or other material, 4 to a fluorescent layer made from zinc sulfide (ZnS) or other semiconductive material, 5 to a second insulative layer similar to the first insulative layer and 6 to a stripe-shaped back electrode opposed to and disposed across the transparent electrode 2 and made from aluminum or other material. Usually, manganese (Mn) or other activator is added to the fluorescent layer 4 to improve the luminescence property.

When an alternating voltage is applied between the transparent electrode 2 and the back electrode 6 in the electroluminescence element having the aforegoing arrangement, the fluorescent layer 4 exhibits light. Therefore, the electroluminescence element can be used as a surface light source, and is practically used as various kinds of flat panel display.

In the arrangement of FIG. 6, however, since the transparent electrode 2 projects from the surface of the insulative substrate 1, it causes an irregularity in crystallization particularly at curved portions 3*a* and 4*a* of the first insulative layer 3 and in the fluorescent layer 4 which are deposited on corners 2*a* of the transparent electrode 2 as shown in FIG. 7 when the first insulative layer 3 and the fluorescent layer 4 are formed by any depositing method. Obviously, this decreases the insulation ability of the first insulative layer 3.

Further, the fluorescent layer 4 is subject to a decrease in the luminescence efficiency and to an increase in the luminescence threshold voltage when an electric field applied thereto concentrates at its curved portions 4*a*. Additionally, it is impossible to increase the thickness of the transparent electrode 2 because it further increases the length of the corner portions. Therefore, particularly when a large display capacity is attempted in a simple matrix driving system, CR time constant determined by the capacitance C and the resistance R of the transparent electrode 2 increases, and this invites a decrease in the brightness.

Because of these problems, the prior art electroluminescence element is not sufficiently reliable as a product.

OBJECT OF THE INVENTION

It is therefore an object of the invention to provide an electroluminescence element ensuring an improved reliability as a product.

SUMMARY OF THE INVENTION

According to the invention, there is provided a field electroluminescence element comprising:

an insulative substrate assembly having a single-level surface made by one surface of an insulative substrate and an adjacent surface of a stripe-shaped transparent electrode provided in the insulative substrate;

a luminescence assembly disposed to cover said single-level plane of said insulative substrate assembly and having an insulative layer on at least one surface thereof; and a back electrode provided at a position opposite to said insulative substrate assembly with respect to said luminescence assembly.

With this arrangement, the surface of the insulative substrate including the transparent electrode thereon exhibits a planar and flat level, and never causes any level difference in the insulative layer and in the fluorescent layer deposited on the insulative substrate surface. Therefore, the reliability of the element as a product can be improved.

DETAILED DESCRIPTION

Figure 1:
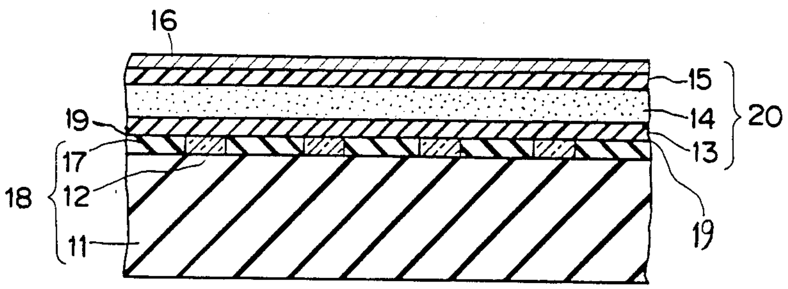
FIG. 1 is a cross-sectional view of an electroluminescence element according to a first embodiment of the invention.

FIG. 1 is a cross-sectional view of an electroluminescence element according to a first embodiment of the invention in which reference numeral 11 refers to an insulative substrate made from glass or other material, 12 to a stripe-shaped transparent electrode in the form of multiple parallel aligned pieces provided on one surface of the insulative substrate 11, and 17 to an insulative layer on the surface of the insulative substrate between respective aligned pieces of the transparent electrodes 12. The insulative substrate 11, transparent electrode 12 and insulative layer 17 form an insulative substrate assembly 18. Aligned pieces of the transparent electrode 12 are merely exposed at upper surfaces thereof, with their side surfaces contacting the insulative layer 17 so that a single-level i.e. unstepped surface is formed by the upper surface of the insulative layer 17 and the upper surface of the transparent electrode 12. As a result, a planar surface 19 is formed on the insulative substrate arrangement 18.

Reference numeral 20 denotes a fluorescent assembly which consists of a fluorescent layer 14 sandwiched by a first insulative layer 13 and a second insulative layer 15 and covering the planar surface 19 of the insulative substrate assembly 18. Reference numeral 16 denotes a stripe-shaped back electrode having multiple parallely aligned pieces which are opposed to and disposed across the aligned pieces of the transparent electrode 12.

The arrangement of FIG. 1 is manufactured in the following process.

The insulative substrate 11 is prepared first, and the insulative layer 17 is deposited on one surface of the substrate 11 by sputtering ZnO up to a thickness of about 1,000 to several thousand Å. Subsequently, aluminum elements in group III or other conductive material is added to desired portions of the insulative layer 17 by ion implantation. As a result, the aluminum-implanted portions exhibit a stripe-shaped transparent electrode 12 in the form of multiple aligned pieces. Alternatively, in contrast to the aforegoing method, transparent ITO as a conductive material may be first formed on the surface of the insulative substrate 11, and charge-compensating impurities may be subsequently added to selected portions on ITO. As a result, impurity-added portions become the insulative layer 17 whereas the other portions become the stripe-shaped transparent electrode 12. Whichever method is employed, the surfaces of the transparent electrode 12 and the insulative layer 17 form the single-level surface 19.

In the next process, the first insulative layer 13, fluorescent layer 14, second insulative layer 15 and back electrode 16 are deposited in sequence on the planar surface 19 of the insulative substrate assembly 18. The first and second insulative layers 13 and 15 are formed by sputtering, EB (electronic beam) thermal deposition, ALE (atomic layer epitaxy) or other method using $Si_3N_4$, $Al_2O_3$, $Y_2O_3$, $PbTiO_3$, $BaTiO_3$, $Ta_2O_5$ or other compound. The fluorescent layer 14 is made from a matrix such as ZnS, ZnSe, CaS and SrS which are semiconductors in II to IV groups, and an activator such as Mn or Lanthanum rare earth element and its fluoride. With this manufacturing process, the planar surface 19 is formed on the surface of the insulative substrate assembly 18 on which the transparent electrode 12 is provided, and the first insulative layer 13 and the fluorescent layer 14 is formed on the planar surface 19 as shown in FIG. 1. Therefore, neither level difference nor undulation is produced in these layers 13 and 14.

Figure 2:
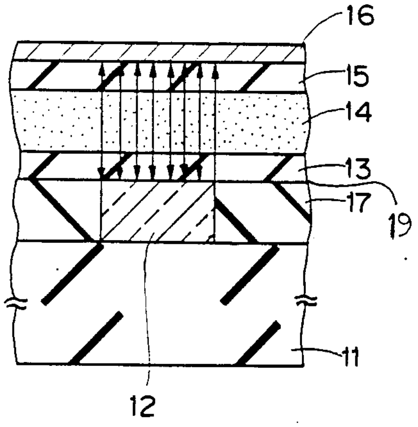
FIG. 2 is a fragmentary, enlarged view of the arrangement of FIG. 1.

As a result, irregular crystallization is never produced in the first insulative layer 13 and the fluorescent layer 14, and the insulation property of the first insulative layer 13 never drops. Further, since no field concentration occurs in the fuorescent layer 14 upon application of an electric field, and the electric field is uniformly applied as shown by arrows in FIG. 2, neither drop in the luminescence efficiency nor large voltage increase of the luminescence threshold occurs. Additionally, since the arrangement permits any desired increase of the thickness of the transparent electrode 12, it is possible to decrease the CR time constant, and the brightness never drops. Therefore, the reliability of the element as a product is significantly improved.

Figure 3:
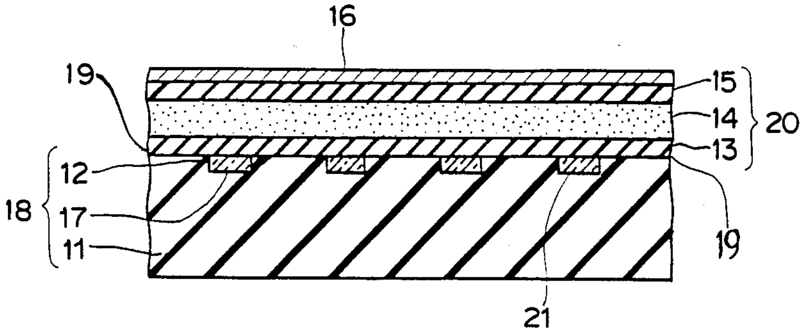
FIG. 3 is a cross-sectional view of an electroluminescence element according to a second embodiment of the invention.

FIG. 3 shows a second embodiment of the invention. An insulative substrate in the form of a flat plate which is a major member of the insulative substrate assembly 18 is provided with grooves 21 in which respective pieces of the stripe-shaped transparent electrode 12 are accepted up to the same level as the surface of the insulative substrate 11 so as to form the single-level surface 19 as a whole. The first insulative layer 13 and other layers are disposed on the planar surface 19 in the same fashion as described before. The second embodiment also has the same function and result as those of the first embodiment.

Figure 4:
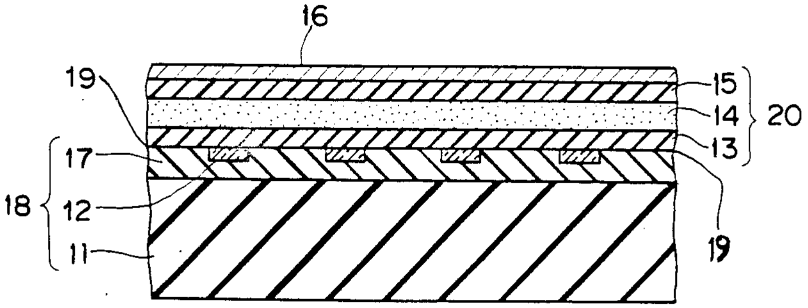
FIG. 4 is a cross-sectional view of an electroluminescence element according to a third embodiment of the invention.

FIG. 4 shows a third embodiment of the invention. An insulative layer 17 is provided on an insulative substrate 11. Ions of a conductive material are applied to selective portions of the insulative layer 17 by ion implantation to form the stripe-shaped transparent electrode 12. The resultant surface exhibits the planar surface 19. Subsequently, the first insulative layer 13 and other layers are deposited on the planar surface 19 in the same fashion as the aforegoing embodiments. The third embodiment also has the same function and result as those of the first embodiment.

In the electroluminescence element manufactured in any one of the above-described processes, when an alternating voltage is applied between the transparent electrode 12 and the back electrode 16, electrons in the fluorescent layer 14 are accelerated up to a sufficiently larger level than a certain energy. Accelerated electrons hit the illuminant center and energize electrons in the illuminant center. When the electrons return to the ground state, light having a wavelength depending to the illuminant center is emitted.

Figure 5:
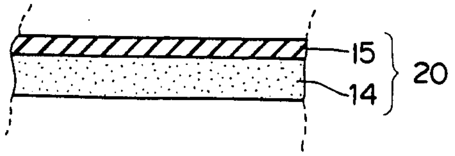
FIG. 5 is a fragmentary, enlarged view of an electroluminescence element according to the invention.
Figure 6:
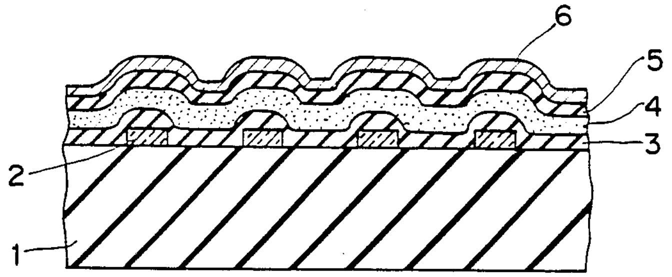
FIG. 6 is a cross-sectional view of a prior art electroluminescence element.
Figure 7:
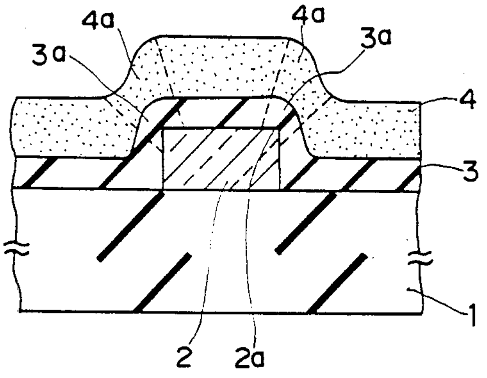
FIG. 7 PRIOR ART
FIG. 7 is a fragmentary, enlarged view of the prior art electroluminescence element.

In the fluorescent assembly 20 shown in each embodiment, the fluorescent layer 14 is sandwiched by the first and second insulative layers 13 and 15. However, it is not necessary to provide insulative layers on opposite surfaces of the fluorescent layer 14. For example, the first insulative layer may be omitted as shown in FIG. 5, and the second insulative layer 15 alone may be used. That is, a single insulative layer may be provided on only one of opposite surfaces of the fluorescent layer 14.

As described above, according to the invention, since the surface of the insulative substrate assembly provided with the transparent electrode is shaped into a single-level plane, and the insulative layer and the fluorescent layer are deposited on the planar surface, no irregular crystallization occurs, and the reliability of the element is improved as a product.

What is claimed is:

1. A field electroluminescence element comprising:

an insulative substrate;

a first insulative layer formed on said insulative substrate and having a planar surface, said first insulative layer having extending from said surface into the interior of said layer and a plurality of transparent conducting regions forming a first set of spaced-apart electrodes embedded in said layer;

a second planar insulative layer disposed on said first insulative layer;

a luminescent layer disposed on said second insulative layer surface;

a third insulative layer disposed on said luminescent layer; and a second set of spaced-apart transparent electrodes disposed on said third insulative layer, said second set of electrodes being opposed to and disposed across the first set of electrodes.

2. A field electroluminescence element comprising:

an insulative substrate having a planar surface, said substrate having extending from said surface into the interior of said substrate a plurality of transparent conducting regions forms a first set of spaced-apart electrodes embedded in said substrate;

a first insulative layer disposed on said substrate surface;

a luminescent layer disposed on said first insulative layer;

a second insulative layer disposed on said luminescent layer; and a second set of spaced-apart transparent electrodes disposed on said second insulative layer, said second set of electrodes being opposed to and disposed across the first set of electrodes.

3. The electroluminescence element of claim 1 wherein said transparent conducting regions are formed by locally exposing portions of said first insulative layer to a conductivity-forming doping agent.

4. The electroluminescence element of claim 2 wherein said transparent conducting regions are formed by locally exposing portions of said insulative substrate to a conductivity-forming doping agent.

* * * * *